US008197973B2

(12) United States Patent
Issaev et al.

(10) Patent No.: US 8,197,973 B2
(45) Date of Patent: Jun. 12, 2012

(54) LITHIUM CELL

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 13/163,178

(22) Filed: Jun. 17, 2011

(65) Prior Publication Data

US 2011/0248682 A1 Oct. 13, 2011

Related U.S. Application Data

(62) Division of application No. 11/725,395, filed on Mar. 19, 2007, now Pat. No. 7,981,550.

(51) Int. Cl.
*H01M 10/0562* (2010.01)
(52) U.S. Cl. .............. 429/322; 429/3; 429/50
(58) Field of Classification Search ............ 429/322
See application file for complete search history.

(56) References Cited

U.S. PATENT DOCUMENTS

| 4,804,595 | A  | * | 2/1989 | Bakos et al. | 429/333 |
| 7,981,550 | B2 | * | 7/2011 | Issaev et al. | 429/322 |
| 2003/0134204 | A1 | * | 7/2003 | Gan et al. | 429/332 |
| 2005/0100786 | A1 | * | 5/2005 | Ryu et al. | 429/199 |

* cited by examiner

*Primary Examiner* — Ula C Ruddock
*Assistant Examiner* — Patricia Davis
(74) *Attorney, Agent, or Firm* — Vladimir Vitenberg

(57) ABSTRACT

A primary cell having an anode comprising lithium and a cathode comprising iron disulfide ($FeS_2$) and carbon particles.

The cell can be in the configuration of a coin cell or the anode and cathode can be spirally wound with separator therebetween and inserted into the cell casing with electrolyte then added. The electrolyte comprises a lithium salt dissolved in a nonaqueous solvent mixture which may include an organic cyclic carbonate such as ethylene carbonate and propylene carbon. The cell after assembly is subjected to a two step preconditioning (prediscahrge) protocol involving at least two distinct discharge steps having at lease one cycle of pulsed current drain in each step and at least one rest period (step rest) between said two steps, wherein said step rest period is carried out for a period of time at above ambient temperature. The preconditioning improves cell performance.

10 Claims, 7 Drawing Sheets

US 8,197,973 B2

LITHIUM CELL

CROSS REFERENCE TO RELATED APPLICATIONS

This application is a divisional of application Ser. No. 11/725,395 filed Mar. 19, 2007 now U.S. Pat. No. 7,981,550.

FIELD OF THE INVENTION

The invention relates to a method for preconditioning a primary cell having an anode comprising lithium and a cathode comprising iron disulfide. A fresh cell is subjected to a pulsed discharge step followed by step rest at elevated temperature, preferably followed by a second pulsed discharge step, thereby preconditioning the cell and improving cell performance

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in a nonaqueous solvent. The cells are referenced in the art as primary lithium cells (primary $Li/MnO_2$ cells) and are generally not intended to be rechargeable, that is, they are intended to be discarded after they have been discharged. Alternative primary lithium cells with lithium metal anodes but having different cathodes are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically an AA size cell or 2/3A $Li/MnO_2$ cell. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.5 volts which is about the same as a conventional $Zn/MnO_2$ alkaline cell. However, the energy density (watt-hrs per $cm^3$ of cell volume) of the $Li/FeS_2$ cell is also much higher than a comparable size $Zn/MnO_2$ alkaline cell. The theoretical specific capacity of lithium metal is high at 3861.7 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ to result in reaction product of elemental iron Fe and $2Li_2S$. That is, 2 of the 4 electrons reducing the valence state of $Fe^{+2}$ in $FeS_2$ to Fe and the remaining 2 electrons reducing the valence of sulfur from −1 in $FeS_2$ to −2 in $Li_2S$.

Overall the $Li/FeS_2$ cell is much more powerful than the same size $Zn/MnO_2$ alkaline cell. That is for a given continuous current drain, particularly for higher current drain over 200 milliAmp, in the voltage vs. time profile the voltage drops off much less quickly for the $Li/FeS_2$ cell than the $Zn/MnO_2$ alkaline cell. This results in a higher energy obtainable from a $Li/FeS_2$ cell compared to that obtainable for a same size alkaline cell. The higher energy output of the $Li/FeS_2$ cell is also clearly shown more directly in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the $Li/FeS_2$ cell is considerably above that for the same size alkaline cell. This is despite that the starting voltage of both cells (fresh) is about the same, namely, between about 1.2 and 1.5 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands Similarly the $Li/FeS_2$ cell which is primary (nonrechargeable) cell can be used as a replacement for the same size rechargeable nickel metal hydride cells, which have about the same voltage (fresh) as the $Li/FeS_2$ cell.

The cathode material may be initially prepared in a form such as a slurry mixture, which can be readily coated onto the metal substrate by conventional coating methods. The electrolyte added to the cell must be a suitable nonaqueous electrolyte for the $Li/FeS_2$ system allowing the necessary electrochemical reactions to occur efficiently over the range of high power output desired. The electrolyte must exhibit good ionic conductivity and also be sufficiently stable to the undischarged electrode materials (anode and cathode) and to the resulting discharge products. This is because undesirable oxidation/reduction reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials.

Primary lithium cells are in use as a power source for digital flash cameras, which require operation at higher power demands than is supplied by individual alkaline cells. Primary lithium cells are conventionally formed of an electrode composite comprising an anode formed of a sheet of lithium, a cathode formed of a coating of cathode active material comprising $FeS_2$ on a conductive metal substrate (cathode substrate) and a sheet of electrolyte permeable separator material therebetween. The electrode composite may be spirally wound and inserted into the cell casing, for examples, as shown in U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal The cell is closed with an end cap which is insulated from the casing. The cathode sheet can be electrically connected to the end cap which forms the cell's positive terminal The casing is typically crimped over the peripheral edge of the end cap to seal the casing's open end.

The anode in a $Li/FeS_2$ cell can be formed by laminating a layer of lithium on a metallic substrate such as copper. However, the anode may be formed of a sheet of lithium without any substrate.

The electrolyte used in a primary $Li/FeS_2$ cells is a non aqueous organic electrolyte formed typically of a "lithium salt" dissolved in an "organic solvent". An "organic electrolyte" includes, but is not limited to, an electrolyte comprising a lithium salt (or other salt) dissolved in an organic solvent. Representative lithium salts which may be used in electrolytes for $Li/FeS_2$ primary cells are referenced in U.S. Pat. Nos. 5,290,414 and 6,849,360 B2 and include such salts as: Lithium trifluoromethanesulfonate, $LiCF_3SO_3$ (LiTFS);

lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures.

Examples of some organic solvents which are referenced in the art for possible use in connection with organic solvents for electrolytes for primary $Li/FeS_2$ cells are as follows: propylene carbonate (PC), ethylene carbonate (EC), butylene carbonate (BC), dimethoxyethane (DME), ethyl glyme, diglyme and triglyme, dimethoxypropane (DMP), dioxolane (DIOX), 3,5-dimethlyisoxazole (DMI), tetrahydrofuran (THF), diethyl carbonate (DEC), ethylene glycol sulfite (EGS), dioxane, dimethylsulfate (DMS), 3-methyl-2-oxazolidone, and sulfolane (SU), and various mixtures. (See, e.g. U.S. Pat. Nos. 5,290,414 and 6,849,360 B2).

In U.S. Pat. No. 5,290,414 is specifically reported use of a beneficial electrolyte for $FeS_2$ cells, wherein the electrolyte comprises a lithium salt dissolved in a solvent comprising dioxolane in admixture with an acyclic (non cyclic) ether based solvent. The acyclic (non cyclic) ether based solvent as referenced may be dimethoxyethane, ethyl glyme, diglyme and triglyme, with the preferred being 1-2 dimetoxyehtane (DME). A specific lithium salt ionizable in such solvent mixture(s) is given as $LiCF_3SO_3$ (LiTFS) or $Li(CF_3SO_2)_2N$ (LiTFSI), or mixtures thereof. A co-solvent selected from 3,5-dimethlyisoxazole (DMI), 3-methyl-2-oxazolidone, propylene carbonate (PC), ethylene carbonate (EC), butylene carbonate (BC), and sulfolane.

In U.S. Pat. No. 6,849,360 B2 is specifically disclosed an electrolyte for an $Li/FeS_2$ cell, wherein the electrolyte comprises the salt lithium iodide dissolved in the organic solvent mixture comprising 1,3-dioxolane (DIOX), 1,2-dimethoxyethane (DME), and small amount of 3,5 dimethylisoxazole (DMI).

Thus, it should be evident from the above representative references that the choice of a particular organic solvent or mixture of different organic solvents for use in conjunction with any one or more lithium salts to produce a suitable electrolyte for the $Li/FeS_2$ cell is challenging. This is not to say that many combinations of lithium salts and organic solvents do not produce a $Li/FeS_2$ cell will not work at all. But rather the problems associated with such cells using an electrolyte formed with just any combination of lithium salt and organic solvent is that the problems encountered will likely be very substantial, thus making the cell impractical for commercial usage. The history of development of lithium cells in general, whether lithium primary cells, e.g. $Li/MnO_2$, $Li/FeS_2$, or rechargeable lithium or lithium ion cells reveals that just any combination of lithium salt and organic solvent cannot be expected to result in a good cell, that is, exhibiting good, reliable performance As an example of a purported advantageous electrolyte mixture the above references reveal advantageous use of dioxolane in combination with an acyclic (non cyclic) ether based solvent, preferably 1,2-dimethoxyethane (DME) to produce an effective electrolyte in conjunction with use of conventional lithium salts. However, dioxolane has the disadvantage of cost and handling.

Accordingly, it is desired to employ solvents for the $Li/FeS_2$ cell electrolyte which are more cost effective and easier to handle than dioxolane. Such solvents can be selected from cyclic organic carbonates, for example, ethylene carbonate (EC) and propylene carbonate (PC), which are less expensive and easier to store and handle than dioxolane. Ethylene carbonate (EC) and propylene carbonate (PC) alone or in admixture and also in admixture with dimethoxyethane (DME) have produced very suitable solvents for electrolytes for use in connection with $Li/MnO_2$ cells, particularly when the lithium salt for the electrolyte comprises $LiCF_3SO_3$ (LITFS). (See, e.g. U.S. Pat. No. 6,443,999 B1)

However, experiments with such electrolytes and electrolyte solvent systems, that is, comprising ethylene carbonate (EC) and propylene carbonate (PC) solvents, while effective in $Li/MnO_2$ cells result in deficiencies when employed, per se, in the context of the $Li/FeS_2$ cell. One of the difficulties is that such ethylene carbonate/ propylene carbonate electrolyte solvent mixtures tend to cause or exacerbate the problem of lithium surface passivation, which normally occurs at least to a degree during the discharge life of the $Li/FeS_2$ cell. Lithium passivation occurs during the $Li/FeS_2$ cell during discharge or storage as a result of gradual reaction with the lithium metal surface in the anode with electrolyte, particularly the electrolyte solvent. An insoluble layer is gradually formed on the lithium metal surface, which tends to passivate the lithium metal surface, making it less reactive. Such surface layers, some more debilitating than others, can reduce the rate of the electrochemical reaction involving the lithium anode metal during cell discharge, thus interfering with proper cell performance Another problem encountered with the use of ethylene carbonate/ propylene carbonate electrolyte solvent mixtures for $Li/FeS_2$ cells is that such solvents tend to cause or exacerbate the problem of initial voltage delay (voltage drop) which may occur typically during an initial phase or initial period of cell usage. Such voltage drop, which can occur at the onset of a new period of cell usage, can reduce the running voltage of the cell for a brief period and thus interfere with attainment of expected consistent, reliable, cell performance Voltage delay is usually associated with increase of internal resistance of the cell, and usually linked to resistance of the passive layer on the lithium anode.

Accordingly, it is desired to produce a $Li/FeS_2$ cell employing a cost effective electrolyte but which cell nevertheless exhibits reduced or suppressed rate of lithium anode passivation.

It is desired to produce a $Li/FeS_2$ cell which exhibits reduced voltage delay (voltage drop) occurring at the onset of any new discharge period.

In particular it is desired to produce an electrolyte for the $Li/FeS_2$ cell wherein the electrolyte comprises a cyclic organic carbonate solvent, in particular a cyclic glycol carbonate desirably such as, but not limited to, ethylene carbonate, propylene carbonate, butylene carbonate, and mixtures thereof. (It should be understood that these aforementioned carbonates are cyclic glycol carbonates but they are conventionally referenced in the art as above named ethylene carbonate, propylene carbonate, and butylene carbonate).

It is desired to produce an electrolyte for a $Li/FeS_2$ cell wherein the electrolyte comprises a solvent which is free of dioxolane.

SUMMARY OF THE INVENTION

The invention is directed to lithium primary cells wherein the anode comprises lithium metal. The lithium may be alloyed with small amounts of an alloy metal, for example aluminum, forming a lithium alloy, which typically comprises less than about 1 wt. % of the alloy metal. The lithium which forms the anode active material, is preferably in the form of a thin foil. The cell has a cathode comprising the cathode active material iron disulfide ($FeS_2$), commonly known as "pyrite". The $Li/FeS_2$ cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide ($FeS_2$) particles onto a conductive metal substrate. The $FeS_2$ particles are bound to the conductive metal substrate using desirably an elastomeric, preferably, a styrene-ethylene /butylene-styrene (SEBS) block copolymer such as Kraton G1651 elastomer (Kraton Polymers, Houston, Tex.). This polymer is a film-former, and possesses good affinity and cohesive properties for the $FeS_2$ particles as well as for conductive carbon particle additives in the cathode mixture.

In an aspect of the invention the cathode is formed of a cathode slurry comprising iron disulfide ($FeS_2$) powder, conductive carbon particles, binder material, and solvent. (The term "slurry" as used herein will have its ordinary dictionary meaning and thus be understood to mean a wet mixture comprising solid particles.) The wet cathode slurry is coated onto a conductive substrate such as a sheet of aluminum or stainless steel. The conductive substrate functions as a cathode current collector. The solvent is then evaporated leaving dry cathode coating mixture comprising the iron disulfide material and carbon particles preferably including carbon black adhesively bound to each other and with the dry coating bound to the conductive substrate. The preferred carbon black is acetylene black. The carbon may optionally include graphite particles blended therein.

After the wet cathode slurry is coated onto the conductive substrate, the coated substrate is placed in an oven and heated at elevated temperatures until the solvent evaporates. The resulting product is a dry cathode coating comprising iron disulfide and carbon particles bound to the conductive substrate. On a dry basis, the cathode preferably contains no more than 4% by weight binder, and between 85 and 95% by weight of $FeS_2$. The solids content, that is, the $FeS_2$ particles and conductive carbon particles in the wet cathode slurry is between 55 and 70 percent by weight. The viscosity range for the cathode slurry is from about 3500 to 15000 mPas. (mPas=mNewton×sec/$m^2$). After the anode comprising lithium metal and cathode comprising iron disulfide, with separator therebetween, are inserted into the cell housing, a nonaqueous electrolyte is added to the cell.

In a principal aspect the invention is directed to mitigating the effect of the lithium passivation layer which develops on the surface of the lithium or lithium alloy anode. (All lithium cells which have exposed lithium metal or lithium metal alloy surfaces can develop a coating or passivation layer thereon, which can reduce the electrochemical reactivity of the lithium surface and increase the cell's internal resistance.) It has been determined that the deleterious effect of the lithium passivation layer can be mitigated by subjecting the Li/$FeS_2$ cell to a preconditioning (predischarge) protocol after the cell is assembled fresh but before it is released for commercial sale. (The term "fresh" or "fresh cell" as used herein is intended to refer to cells that have been manufactured but not yet released for commercial use.)

In a principal aspect of the invention the preconditioning of the fresh Li/$FeS_2$ cell involves a two step predischarge protocol wherein the cell is subjected to at least two distinct discharge steps having at lease one cycle of pulsed current drain in each step and at least one rest period (step rest) between said two discharge steps. The step rest period is in effect cell storage period wherein the cell is placed in storage for a period of time, at a temperature of above ambient temperature (>21° C.), typically at an elevated temperature between about 21° C. and 70° C., preferably between about 40 and 70° C., for example about 60° C. The step rest (storage) period may typically be for a period between about 2 and 24 hours. Preferably after the second discharge step there is also a similar step rest (storage) wherein the cell is stored above ambient temperature (>21° C.), typically between about 21 and 70° C., preferably between about 40 and 70° C. for a period typically between about 2 and 24 hours.

Thus by way of example, the two discharge steps involve at least one pulsed cycle comprising at least one pulse of discharge, e.g. at least one pulse of continuous current typically for a relatively short time such as average between about 2 and 20 seconds. Thus the term "pulse" or "pulse drain" is intended to include a relatively short burst of current drain typically up to about 20 seconds (or even longer) in duration. Such pulses when occurring may be at a fixed or variable current density desirably between about 1 and 50 mAmp/$cm^2$, thus, typically having an average current density of between about 1 and 50 mAmp/$cm^2$. (The current density applies to the current passing between the interfacial area between anode surface and facing cathode surface in either a coin cell or spirally wound cell.) The pulses at desired current density may be achieved by various methods, for example, by discharge at constant current, constant voltage or constant power. Preferably there are at least two consecutive pulses in each of the two discharge steps. The pulses in each of the two discharge steps may be at a fixed or variable current density typically having an average current density of between about 1 and 50 mAmp/$cm^2$. Each pulse in each of the two discharge steps may be followed by a brief intermittent pulse rest, for a short period typically between about 10 and 100 seconds thereby completing one pulsed cycle.

The first discharge step may have a single pulsed cycle or it may have a multiplicity of pulse cycles, for example, involving typically between about 1 and 100 consecutive pulses therein, such as, 5, 10, 15, 20 or more consecutive pulses with said short intermittent rest typically between about 10 and 100 seconds between pulses. At the conclusion of the first discharge step involving one or more of such pulse cycles (pulse followed by intermittent pulse rest), the cell is subjected to step rest (storage) wherein it is exposed a temperature of between about 21° C. and 70° C., preferably between about 40 and 70° C., for a period between about 2 and 24 hours. The cell is then subjected to a second discharge step involving at least one new pulsed current drain. However, the second step may include a multiplicity of pulses for example, involving typically between about 1 and 100 consecutive pulses, such as, 5, 10, 15, 20 or more pulses as in the first discharge step with said short intermittent rest of between about 10 and 100 seconds between said consecutive pulses. Preferably after this second step the cell is also stored at a temperature between about 21° C. and 70° C. for a period, preferably between about 40 and 70° C., typically between about 2 and 48 hours (step rest). The totality of the pulsed discharges in the preconditioning (predischarge) protocol of the invention may consume up to about 10 percent of the cell's theoretical capacity.

It has been determined that when a fresh Li/$FeS_2$ cell is subjected to such preconditioning protocol of the invention there is a marked improvement in cell performance That is, the cell will maintain a higher voltage profile at a given discharge current than if the cell was not subjected to the preconditioning protocol of the invention. This in turn results in a higher energy output for the Li/$FeS_2$ cell which was subjected to the preconditioning protocol of the invention. The improved performance can be expected regardless of cell shape or configuration (e.g. button cell or wound cylindrical cell).

The preconditioning (predischarge) protocol of the invention to which a fresh Li/FeS2 cell is subjected is believed to have a mitigating effect on the lithium passivation layer which develops on the surface of the lithium anode. It is believed that the preconditioning (predischarge) protocol of the invention stabilizes the lithium passivation layer and may also alter its chemistry. This in turn can reduce the resistance of the lithium passivation layer and reduces the cell's internal resistance to improve cell performance The preconditioning protocol, which involves at least one cell storage period (step rest) at above ambient temperature after a discharge step involving at least one pulsed discharge cycle, may also help to remove impurities from the electrolyte and cathode, thus improving the effectiveness of the electrolyte and cathode material.

In a principal aspect of the invention the desired nonaqueous electrolyte for the lithium/iron disulfide cell comprises a lithium salt dissolved in an organic solvent. A desirable electrolyte solvent mixture has been determined to comprise a cyclic organic carbonate, preferably a cyclic glycol carbonate such as ethylene carbonate, propylene carbonate or butylene carbonate, and mixtures thereof, in admixture with an organic ether, preferably a glycol ether, desirably 1,2-dimethoxyethane (DME). (Dimethoxyethane is also referenced in the chemical literature as ethylene glycol dimethyl ether and has the chemical formula $CH_3OCH_2CH_2OCH_3$.) (The electrolyte solvent may also include dimethylcarbonate and/or ethyl methyl carbonate). Preferably elemental iodine is added to the electrolyte mixture so that it comprises between about 0.01 and 5 wt. % of the electrolyte mixture, preferably about 0.5 wt. % of the nonaqueous electrolyte mixture. (The desirability of adding elemental iodine to nonaqueous electrolyte mixtures for Li/FeS$_2$ cells is disclosed in commonly assigned U.S. patent application Ser. No. 11/479,328, filed Jul. 1, 2006.)

A preferred electrolyte solvent comprises dimethoxyethane (formula $C_4H_{10}O_2$) in admixture with ethylene carbonate (EC) (formula $C_3H_4O_3$) and propylene carbonate (PC) (formula $C_4H_6O_3$) and. Ethylene carbonate and propylene carbonate are cyclic organic carbonates. Ethylene carbonate has a Chemical Abstracts Service CAS No. 96-49-1. Propylene carbonate has a Chemical Abstracts Service (CAS) Registry identification, CAS No. 108-32-7. Basic property data for these solvents is readily available, for example, in the Condensed Chemical Dictionary, 10 Edition, Revised by Gessner G. Hawley, Van Nostrand Reinhold Company. Additional property and formula data is also available, for example, by entering the above solvent names, ethylene carbonate, propylene carbonate (as well as butylene carbonate) into the Google search web site: www.Google.com.

A preferred electrolyte solvent comprises a mixture of dimethoxyethane (DME) in admixture with ethylene carbonate (EC) and propylene carbonate (PC). Each of these solvents are resistant to oxidation by FeS$_2$ and are stable to the discharge products of the Li/FeS$_2$ system. Such solvent mixture does not interfere adversely with the properties of the binder material. For example, such solvent mixture does not react with the elastomeric binder, e.g. Kraton G1651 styrene-ethylene/butylene-styrene block copolymer, in sufficient degree to noticeably interfere with the binder properties. Preferably the electrolyte solvent mixture comprises dimethoxyethane (DME) between about 40 and 98 wt. %, ethylene carbonate (EC) between 1 and 30 wt. % and propylene carbonate (PC) between 1 and 30 wt. % The electrolyte solvent mixture may be free of dioxolane, that is, may contain no detectable amount of dioxolane. The electrolyte solvent mixture may be essentially free of dioxolane, that is, contain only trace amounts of dioxolane, e.g. less than 100 ppm of the solvent mixture, e.g. less than 50 ppm dioxolane, e.g. less than 25 ppm dioxolane. At such low concentrations the trace amounts of dioxolane would not be expected to serve any particular function.

A desirable electrolyte mixture for the Li/FeS$_2$ cell of the invention has been determined to comprise the lithium salt lithium trifluoromethane sulfonate chemical formula LiCF$_3$SO$_3$ (LiTFS) and/or lithium bistrifluoromethylsulfonyl imide chemical formula Li(CF$_3$SO$_2$)$_2$N (LiTFSI) dissolved in an organic solvent mixture comprising dimethoxyethane (DME), ethylene carbonate (EC), and propylene carbonate (PC). A preferred electrolyte mixture has been determined to be an electrolyte solution comprising between about 0.3 molar to 0.6 molar (0.3 to 0.6 mol/liter) LiCF$_3$SO$_3$ (LiTFS) salt and 0.3 molar to 0.6 molar (0.3 to 0.6 mol/liter) Li(CF$_3$SO$_2$)$_2$N (LiTFSI) salt, 0.25 wt % LiClO4 and 0.5 wt % elemental iodine dissolved in an organic solvent mixture comprising between about 75 and 95 wt % dimethoxyethane (DME), between 2 and 10 wt. % ethylene carbonate (EC), and between about 3 and 15 wt. % propylene carbonate (PC). The LiClO$_4$ is optional but its inclusion in the electrolyte is desirable because it functions as an anticorrosion inhibitor for the aluminum or aluminum alloy grid or substrate onto which the cathode coating comprising iron disulfide is coated. Elemental iodine (I$_2$) is desirably added to such electrolyte mixture for Li/FeS$_2$ cells. The desirability of adding elemental iodine to nonaqueous electrolyte mixtures for Li/FeS$_2$ cells is disclosed in commonly assigned U.S. patent application Ser. No. 11/650,405, filed Jan. 5, 2007. The addition of the iodine has been determined to mitigate the deleterious effect of the lithium passivation layer which accumulates on the surface of the lithium anode. It is believed the presence of elemental iodine in the electrolyte helps to mitigate the effect of the lithium passivation layer on the surface of the lithium anode by altering the chemistry of the lithium passivation layer, that is, to make it less resistive. Thus both the above referenced preconditioning protocol of the invention to which a fresh cell is subjected together with inclusion of elemental iodine in the electrolyte both appear to have a compounding effect of mitigating the effect of the lithium passivation layer on the surface of the lithium anode. This in turn improves cell performance The addition of elemental iodine to the nonaqueous electrolyte also resolves or mitigates the problem of voltage delay (voltage drop) which may otherwise occur or be more significant at the onset of a fresh discharge period of a Li/FeS$_2$ cell employing electrolyte comprising cyclic organic carbonate solvents such as ethylene carbonate (EC) and/or propylene carbonate (PC).

Alternatively, elemental bromine or mixtures of elemental iodine and bromine may be added to such electrolyte mixture for Li/FeS$_2$ cells. The elemental iodine is preferably added to the electrolyte mixture so that it comprises between about 0.01 and 5 wt. % of the electrolyte mixture, preferably about 0.5 wt. % of the electrolyte mixture. (The elemental bromine or mixtures of elemental iodine and bromine may also be added to the electrolyte mixture so that it comprises between about 0.01 and 5 wt. % of the electrolyte mixture, preferably about 0.5 wt. % of the electrolyte mixture.) Most all of the elemental iodine added to the electrolyte mixture remains in elemental form, that is, does not convert to ionic form when added. It is estimated that at least 90 percent of the added elemental iodine (or bromine) stays in elemental form when added to the above electrolyte solvent mixture. (The term "elemental iodine" as used herein includes iodine, I$^0$, and the normal diatomic state of iodine, I$_2$. Similarly the term "elemental bromine" as used herein includes bromine, $Br^0$, and the normal diatomic state of bromine $Br_2$.)

If the cathode slurry comprising $FeS_2$ powder and conductive carbon is coated onto a sheet of aluminum substrate (cathode current collector), the presence of elemental iodine in the electrolyte can also retard the rate of aluminum surface corrosion which can develop during normal usage or storage of the $Li/FeS_2$ cell.

The electrolyte mixture employed in the $Li/FeS_2$ cell described herein does not undergo reaction with the electrode materials or discharge products or result in excessive gassing during normal usage. The electrolyte mixture may be beneficially employed in a coin (button) cell or wound cell for the $Li/FeS_2$ cell system.

DETAILED DESCRIPTION

The $Li/FeS_2$ cell of the invention may be in the form of a flat button cell or a spirally wound cell. A desirable button cell 100 configuration comprising a lithium anode 150 and a cathode 170 comprising iron disulfide ($FeS_2$) with separator 160 therebetween is shown in the FIG. 1A.

The $Li/FeS_2$ cell as in cell 100 has the following basic discharge reactions (one step mechanism):

Anode:

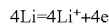

$4Li=4Li^++4e$   Eq. 1

Cathode:

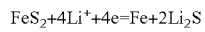

$FeS_2+4Li^++4e=Fe+2Li_2S$   Eq. 2

Overall:

$FeS_2+4Li=Fe+2Li_2S$   Eq. 3

Figure 1:
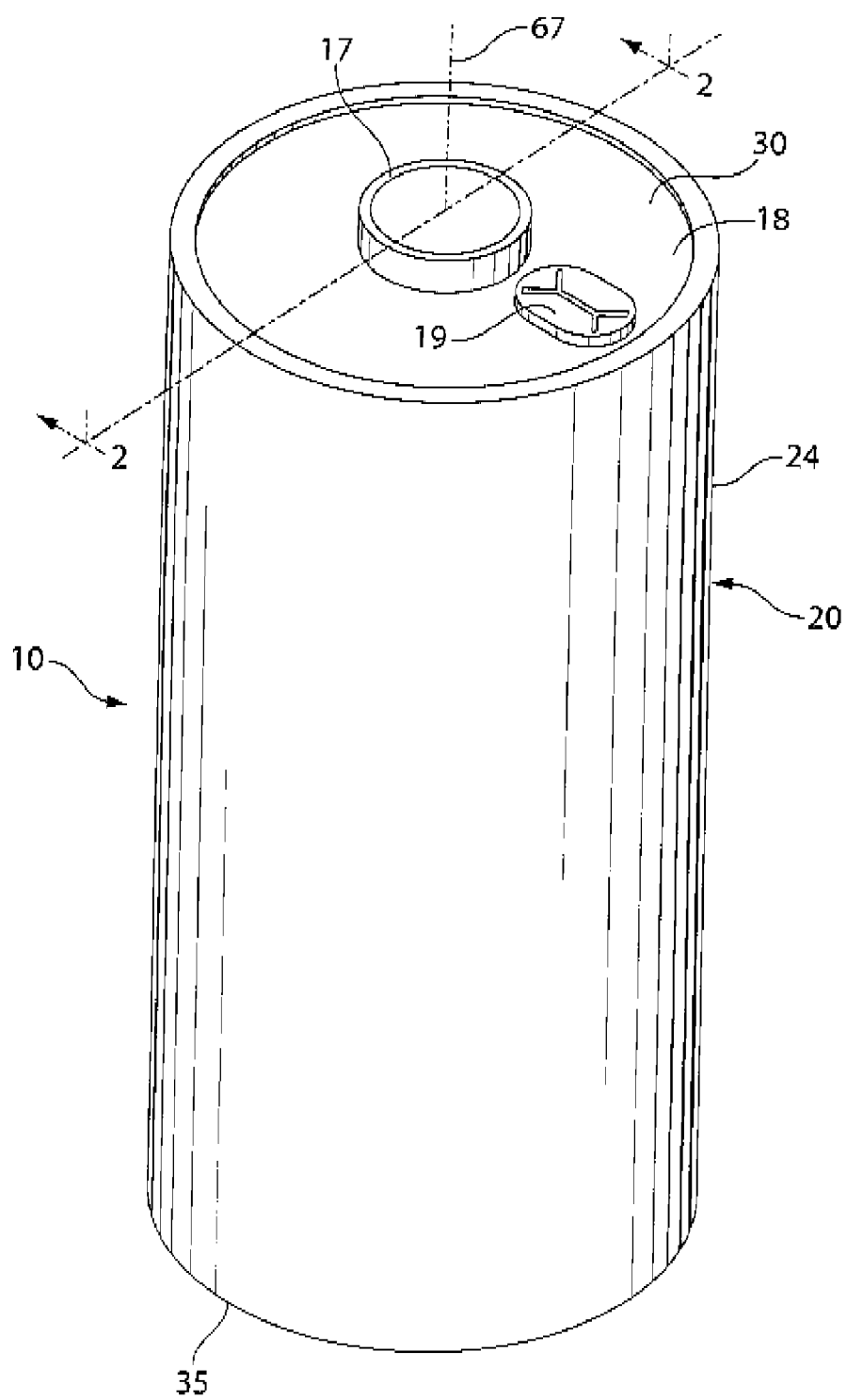
FIG. 1 is an isometric view of an improved $Li/FeS_2$ cell of the invention as presented in a cylindrical cell embodiment.
Figure 1A:
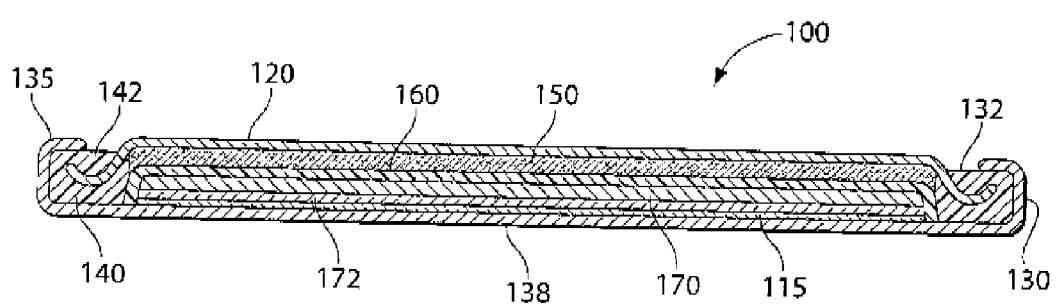
FIG. 1A is a cross sectional view of an improved $Li/FeS_2$ cell of the invention as presented in a button cell embodiment.

The example of $Li/FeS_2$ testing vehicle is button cell 100 shown in FIG. 1A may be in the form of a primary (nonrechargeable) cell. By nonrechargeable is meant that the cell is intended to be discarded after it has been discharged. In the button cell 100 (FIG. 1A) a disk-shaped cylindrical cathode housing 130 is formed having an open end 132 and a closed end 138. Cathode housing 130 is preferably formed from nickel-plated steel. An electrical insulating member 140, preferably a plastic cylindrical member having a hollow core, is inserted into housing 130 so that the outside surface of insulating member 140 abuts and lines the inside surface of housing 130. Alternatively, the inside surface of housing 130 may be coated with a polymeric material that solidifies into insulator 140 abutting the inside surface of housing 130. Insulator 140 can be formed from a variety of thermally stable insulating materials, for example polypropylene.

A cathode current collector 115 comprising a metallic grid can be inserted into the cell so that it abuts the inside surface of the closed end 138 of the housing 130. The cathode current collector 115 may desirably be composed of a sheet of expanded stainless steel metal foil, having a plurality of openings therein, thus forming a stainless steel grid or screen. The expanded stainless steel metal foil is available as EXMET foil 316L-SS from Dexmet Corp. Preferably, however, the cathode current collector 115 is composed of a sheet of aluminum, which is more conductive. (The cathode current collector 115 may be a sheet of aluminum alloyed with common aluminum alloy metals such as magnesium, copper, and zinc.) Such aluminum current collector sheet 115 may also have a plurality of small openings therein, thus forming an aluminum grid. The cathode current collector 115 can be welded onto the inside surface of the closed end 138 of the housing 130. (Optionally, the same type of current collector grid, preferably of expanded stainless steel metal foil with openings therein, may be welded to the inside surface of the closed end of the anode cover 120.) An optional conductive carbon base layer 172 comprising a mixture of graphite and polytetrafluoroethylene (PTFE) binder can be compressed into the cathode current collector 115. The cathode material 170 comprising the $FeS_2$ active particles may then be coated onto such conductive base layer 172. This may be termed a "staged" cathode construction.

The cathode material 170 comprising iron disulfide ($FeS_2$) or any mixture including iron disulfide ($FeS_2$) as active cathode material, may thus be inserted over optional conductive base layer 172 so that it overlies current collector sheet 115. The cathode active material, that is, the material undergoing useful electrochemical reaction, in cathode layer 170 can be composed entirely of iron disulfide ($FeS_2$). The cathode 170 comprising iron disulfide ($FeS_2$) powder dispersed therein can be prepared in the form of a slurry which may be coated on both sides of a conductive metal foil, preferably an aluminum or stainless steel foil. Such aluminum or stainless steel foil may have openings therethrough, thus forming a grid or screen. Alternatively, the cathode 170 comprising iron disulfide ($FeS_2$) powder dispersed therein can be prepared in the form of a slurry which is coated on just the side of an aluminum or stainless steel foil facing separator 160. In either case a conductive base layer 172, as above described, may be employed in which case cathode 170 is inserted in the cell so that it overlies conductive base layer 172 as shown in FIG. 1A.

Alternatively, the cathode 170 comprising iron disulfide ($FeS_2$) powder dispersed therein can be prepared in the form of a slurry which may be coated directly onto a conductive substrate sheet 115 to form a cathode composite. Preferably conductive substrate sheet 115 is formed of a sheet of aluminum (or aluminum alloy), as above described, and may have a plurality of small apertures therein, thus forming a grid. Alternatively, the conductive substrate sheet 115 may be a sheet of stainless steel, desirably in the form of expanded stainless steel metal foil, having a plurality of small apertures therein.

The cathode slurry comprises 2 to 4 wt % of binder (Kraton G1651 elastomeric binder from Kraton Polymers, Houston Tex.); 50 to 70 wt % of active $FeS_2$ powder; 4 to 7 wt % of conductive carbon (carbon black and graphite); and 25 to 40 wt % of solvent(s). (The carbon black may include in whole or in part acetylene black carbon particles. Thus, the term carbon black as used herein shall be understood to extend to and include carbon black and acetylene black carbon particles.) The Kraton G1651 binder is an elastomeric block copolymer (styrene-ethylene/butylene (SEBS) block copolymer) which is a film-former. This binder possesses sufficient affinity for the active $FeS_2$ and carbon black particles to facilitate preparation of the wet cathode slurry and to keep these particles in contact with each other after the solvents are evaporated. The $FeS_2$ powder may have an average particle size between about 1 and 100 micron, desirably between about 10 and 50 micron. A desirable $FeS_2$ powder is available under the trade designation Pyrox Red 325 powder from Chemetall GmbH, wherein the $FeS_2$ powder has a particle size sufficiently small that of particles will pass through a sieve of Tyler mesh size 325 (sieve openings of 0.045 mm) (The residue amount of $FeS_2$ particles not passing through the 325 mesh sieve is 10% max.) The graphite is available under the trade designation Timrex KS6 graphite from Timcal Ltd. Timrex graphite is a highly crystalline synthetic graphite. (Other graphites may be employed selected from natural, synthetic, or expanded graphite and mixtures thereof, but the Timrex graphite is preferred because of its high purity.) The carbon black is available under the trade designation Super P conductive carbon black (BET surface of 62 $m^2/g$) from Timcal Co.

The solvents preferably include a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as Shell Sol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders are first blended to ensure uniformity before being added to the binder solution in the mixing bowl.

A preferred cathode slurry mixture is presented in Table 1:

TABLE I

| Cathode Slurry | |
|---|---|
| | Wet Slurry (wt. %) |
| Binder (Kraton G1651) | 2.0 |
| Hydorcarbon Solvent (ShellSol A100) | 13.4 |
| (ShellSol OMS) | 20.2 |
| $FeS_2$ Powder (Pyrox Red 325) | 58.9 |
| Graphite (Timrex KS6) | 4.8 |
| Carbon Black (Super P) | 0.7 |
| Total | 100.0 |

The total solids content of the wet cathode slurry mixture 170 is shown in above Table 1 is 66.4 wt. %

The wet cathode slurry 170 is applied to the current collector 115 using intermittent roll coating technique. As above indicated current collector sheet 115 is optionally precoated with a carbon base layer 172 before the wet cathode slurry is applied. The cathode slurry coated on the metal substrate 115 is dried gradually adjusting or ramping up the temperature from an initial temperature of 40° C. to a final temperature of about 130° C. in an oven until the solvent has all evaporated. (Drying the cathode slurry in this manner avoids cracking.) This forms a dry cathode coating 170 comprising $FeS_2$, carbon particles, and binder on the metal substrate 115. The coated cathode is then passed between calendering rolls to obtain the desired cathode thicknesses. A representative desirable thickness of dry cathode coating 170 is between about 0.172 and 0.188 mm, preferably about 0.176 mm. The dry cathode coating 170 thus has the following desirable formulation: $FeS_2$ powder (89 wt. %); Binder (Kraton G1651), 3 wt. %; Graphite (Timrex KS6), 7 wt. %, and Carbon Black (Super P), 1 wt %. The carbon black (Super P carbon black) develops a carbon network which improves conductivity.

The cathode composite comprising current collector sheet 115, cathode base layer 172, and dry cathode coating 170 thereon may then be inserted into cathode housing 130. A separator sheet 160 preferably comprising a microporous polypropylene may then be inserted over the cathode coating 170.

A nonaqueous electrolyte for the $Li/FeS_2$ cell may then be added so that it fully penetrates through separator sheet 160 and cathode layer 170. A nonaqueous electrolyte mixture can be added so that it becomes absorbed into the separator and cathode coating. The desired nonaqueous electrolyte comprises a lithium salt or mixture of lithium salts dissolved in an organic solvent.

The nonaqueous electrolyte comprises a lithium salt dissolved in an organic solvent preferably comprising dimethoxyethane, and a cyclic organic carbonate, preferably ethylene carbonate and propylene carbonate. The desired electrolyte solvent mixture thus comprises a cyclic organic carbonate, preferably a cyclic glycol carbonate such as ethylene carbonate, propylene carbonate or butylene carbonate, and mixtures thereof, in admixture with dimethoxyethane, preferably 1,2 dimethoxyethane. (The electrolyte solvent may also include dimethylcarbonate and/or ethyl methyl carbonate).

A desirable solvent thus comprises dimethoxyethane (DME), ethylene carbonate (EC), and propylene carbonate (PC). Preferably the dimethoxyethane (DME) comprises between about 40 and 98 wt %, the ethylene carbonate (EC) comprises between 1 and 30 wt. %, and the propylene carbonate (PC) comprises between 1 and 30 wt % of the electrolyte solvent mixture. A desirable electrolyte for the Li/FeS$_2$ wound cell has been determined to comprise lithium salts lithium trifluoromethanesulfonate having the chemical formula LiCF$_3$SO$_3$ which can be referenced simply as LiTFS and/or the lithium salt Li(CF$_3$SO$_2$)$_2$N (LiTFSI) dissolved in the above organic solvent mixture comprising dimethoxyethane (DME), ethylene carbonate (EC), and propylene carbonate (PC). Preferably elemental iodine is added to the above electrolyte mixture so that it comprises between about 0.01 and 5 wt. % of the electrolyte mixture, preferably about 0.5 wt. % of the nonaqueous electrolyte. (The desirability of adding elemental iodine to nonaqueous electrolyte mixtures for Li/FeS$_2$ cells is disclosed in commonly assigned U.S. patent application Ser. No. 11/479328, filed Jul. 1, 2006.)

A first preferred electrolyte (Electrolyte 1) has been determined to be an electrolyte solution comprising 0.3 molar (0.3 mol/liter) LiCF$_3$SO$_3$ (LiTFS) salt and 0.6 molar (0.6 mol/liter) Li(CF$_3$SO$_2$)$_2$N (LiTFSI) salt, 0.25 wt % LiClO4 and 0.5 wt % elemental iodine dissolved in an organic solvent mixture comprising about 95 wt % dimethoxyethane (DME), 2 wt. % ethylene carbonate (EC), and 3 wt. % propylene carbonate (PC). The elemental iodine can be eliminated but better cell performance is obtained with the iodine added. The electrolyte mixture is desirably added on the basis of about 0.4 gram electrolyte solution per gram FeS$_2$.

A second preferred electrolyte (Electrolyte 2) has been determined to be an electrolyte solution comprising 0.54 molar (0.54 mol/liter) LiCF$_3$SO$_3$ (LiTFS) salt and 0.36 molar (0.36 mol/liter) Li(CF$_3$SO$_2$)$_2$N (LiTFSI) salt, 0.25 wt % LiClO4 and 0.5 wt % elemental iodine dissolved in an organic solvent mixture comprising about 75 wt. % dimethoxyethane (DME), 10 wt. % ethylene carbonate (EC), and 15 wt. % propylene carbonate (PC). The elemental iodine can be eliminated but better cell performance is obtained with the iodine added. The electrolyte mixture is desirably added on the basis of about 0.4 gram electrolyte solution per gram FeS$_2$.

A layer of anode material 150, typically a sheet of lithium or lithium alloy may then be placed over separator sheet 160. The anode cover 120, formed preferably from nickel-plated steel, is inserted into open end 132 of housing 130 and peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and housing 130 at the closed end 138 functions as the positive terminal of the cell.

In another embodiment the Li/FeS$_2$ cell may be in the configuration of a cylindrical cell 10 as shown in FIG. 1. The cylindrical cell 10 may have a spirally wound anode sheet 40, cathode 60 with separator sheet 50 therebetween as shown in FIGS. 2-5. The Li/FeS$_2$ cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide (FeS$_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a 2/3 A cell (35×15 mm) However, it is not intended to limit the cell configuration to cylindrical shape. Alternatively, the cell of the invention may have an anode comprising lithium metal and a cathode comprising iron disulfide (FeS$_2$) having the composition and nonaqueous electrolyte as herein described in the form of a spirally wound prismatic cell, for example a rectangular cell having the overall shape of a cuboid.

Figure 3:
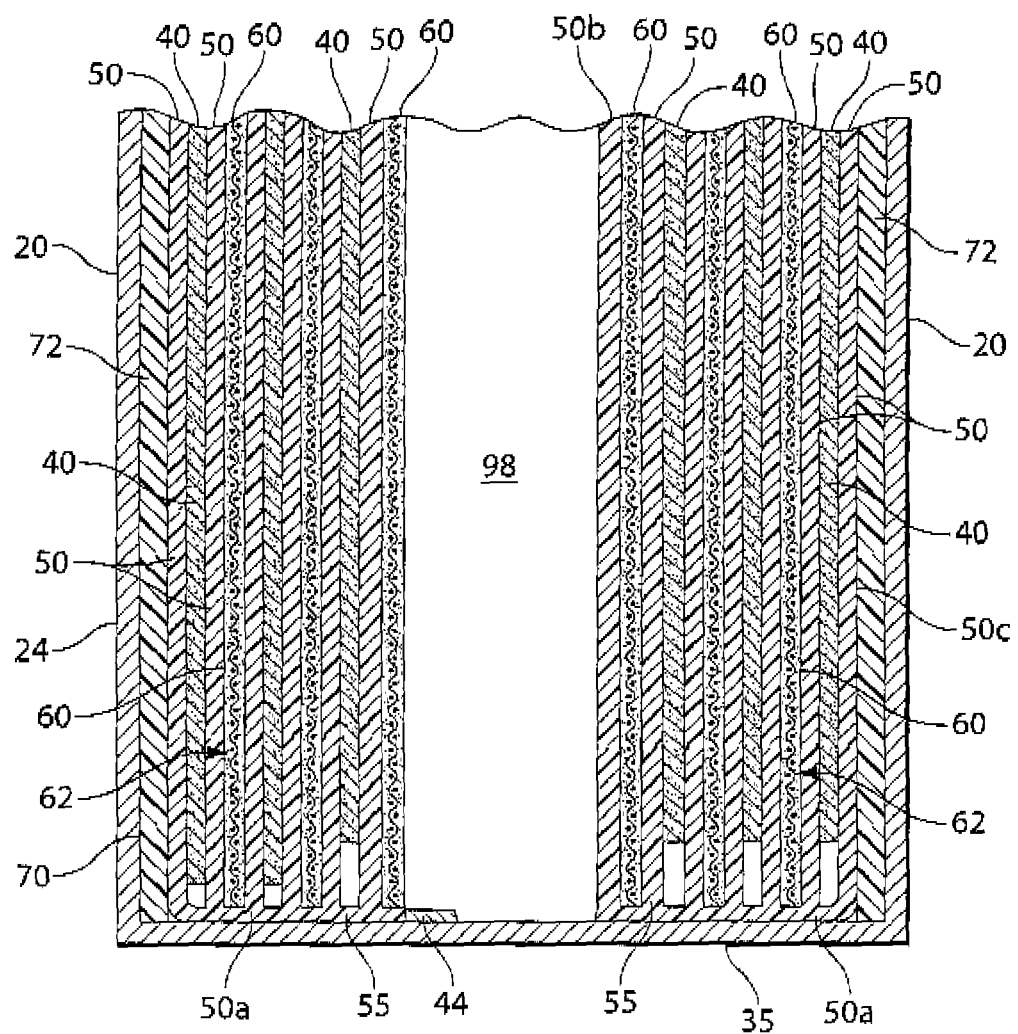
FIG. 3 is a partial cross sectional elevation view of the cell taken through sight lines 2-2 of FIG. 1 to show a spirally wound electrode assembly.
Figure 4:
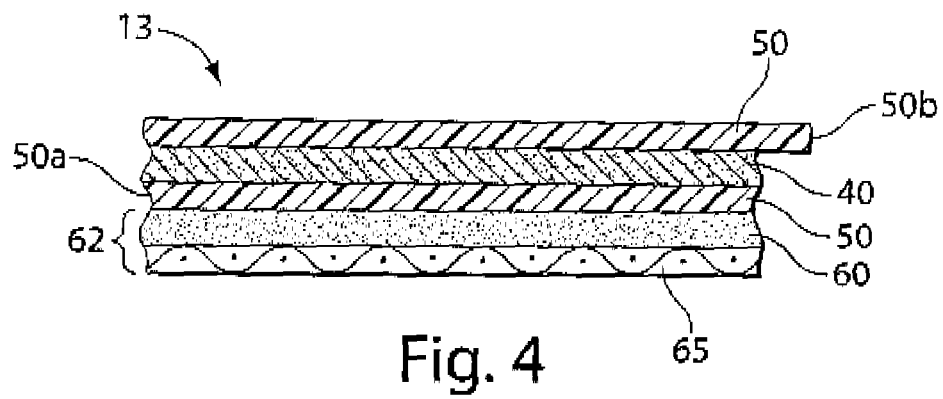
FIG. 4 is a schematic showing the placement of the layers comprising the electrode assembly.
Figure 5:
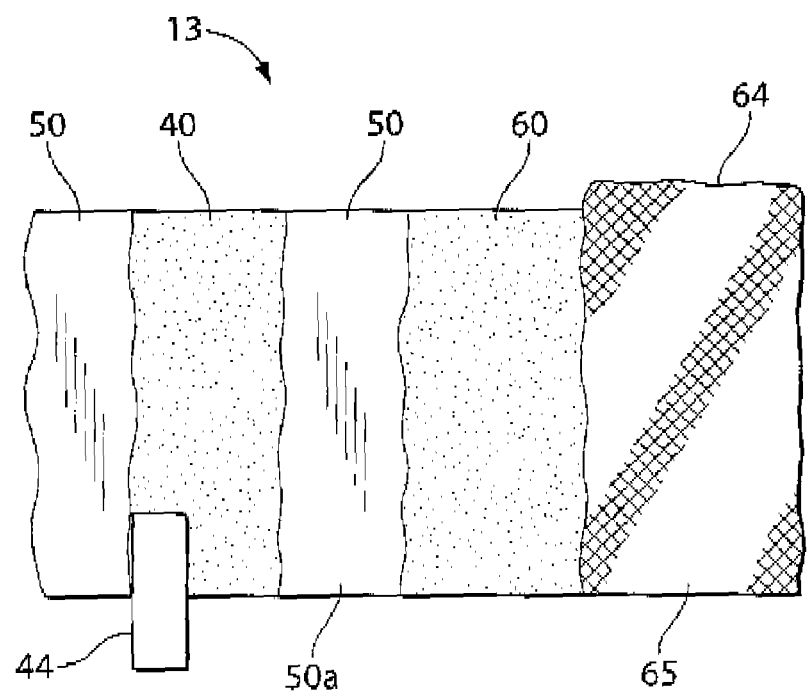
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide (FeS$_2$) coated onto metallic substrate 65 (FIG. 4).

The electrode composite 13 (FIGS. 4 and 5) can be made in the following manner: The cathode 60 comprising iron disulfide (FeS$_2$) powder dispersed therein can be initially prepared in the form of a wet slurry which is coated onto a conductive substrate sheet 65, preferably a sheet of aluminum or stainless steel expanded metal foil, to form a cathode composite sheet 62 (FIG. 4). If an aluminum sheet 65 is used it may be a sheet of aluminum without openings therethrough or may be a sheet of expanded aluminum foil (EXMET expanded aluminum foil) with openings therethrough thus forming a grid or screen.

The wet cathode slurry mixture having the composition shown above in Table 1 comprising iron disulfide (FeS$_2$), binder, conductive carbon and solvents is prepared by mixing the components shown in Table 1 until a homogeneous mixture is obtained.

The above quantities (Table 1) of components of course can be scaled proportionally so that small or large batches of cathode slurry can be prepared. The wet cathode slurry thus preferably has the following composition: FeS$_2$ powder (58.9 wt. %); Binder, Kraton G1651 (2 wt. %); Graphite, Timrex KS6 (4.8 wt %), Actylene Black, Super P (0.7 wt %), Hydrocarbon Solvents, ShellSol A100 (13.4 wt %) and ShelSol OMS (20.2 wt %)

The cathode slurry is coated onto one side (optionally both sides) of a conductive substrate or grid 65, preferably a sheet of aluminum, or stainless steel expanded metal foil. The cathode slurry coated on the metal substrate 65 is dried in an oven preferably gradually adjusting or ramping up the temperature from an initial temperature of 40° C. to a final temperature not to exceed 130° C. for about ½ hour or until the solvent has all evaporated. This forms a dry cathode coating 60 comprising FeS$_2$, carbon particles, and binder on the metal substrate 65 and thus forms the finished cathode composite sheet 62 shown best in FIG. 4. A calendering roller is then applied to the coating to obtain the desired cathode thicknesses. For an AA size cell, the desired thickness of dry/cathode coating 60 is between about 0.172 and 0.188 mm, preferably about 0.176 mm. The dry cathode coating thus has the following desirable formulation: FeS$_2$ powder (89.0 wt. %); binder, Kraton G1651 elastomer (3.0 wt. %); conductive carbon particles, preferably graphite (7 wt. %) available as Timrex KS6 graphite from Timcal Ltd and conductive carbon black (1 wt %) available as Super P conductive carbon black from Timcal. The carbon black develops a carbon network which improves conductivity. Optionally between about 0 and 90 percent by weight of the total carbon particles may be graphite. The graphite if added may be natural, synthetic or expanded graphite and mixtures thereof. The dry cathode coating may typically comprise between about 85 and 95 wt. % iron disulfide (FeS$_2$); between about 4 and 8 wt. % conductive carbon; and the remainder of said dry coating comprising binder material.

The cathode substrate 65 can be a sheet of conductive metal foil, for example, a sheet of aluminum or stainless steel, with or without apertures therein. The cathode conductive substrate 65 is preferably a sheet of aluminum. The aluminum sheet 65 may have a plurality of small apertures therein, thus forming a grid or screen. Alternatively, cathode conductive substrate 65 may be formed of a sheet of stainless steel expanded metal foil (EXMET stainless steel foil from Dexmet Company, Branford, Conn.) having a basis weight of about 0.024 g/cm$^2$ forming a mesh or screen with openings therein. The EXMET expanded stainless steel foil may have openings therethrough forming a grid or screen. The cathode conductive substrate 65 secures the cathode coating 60 and functions as a cathode current collector during cell discharge.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum. In such case the alloy metal, is present in very small quantity, preferably less than 1 percent by weight of the lithium alloy. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm, preferably about 0.15 mm for the spirally wound cell.

Individual sheets of electrolyte permeable separator material 50, preferably of microporous polypropylene having a thickness of about 0.025 mm is inserted on each side of the lithium anode sheet 40 (FIGS. 4 and 5). The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
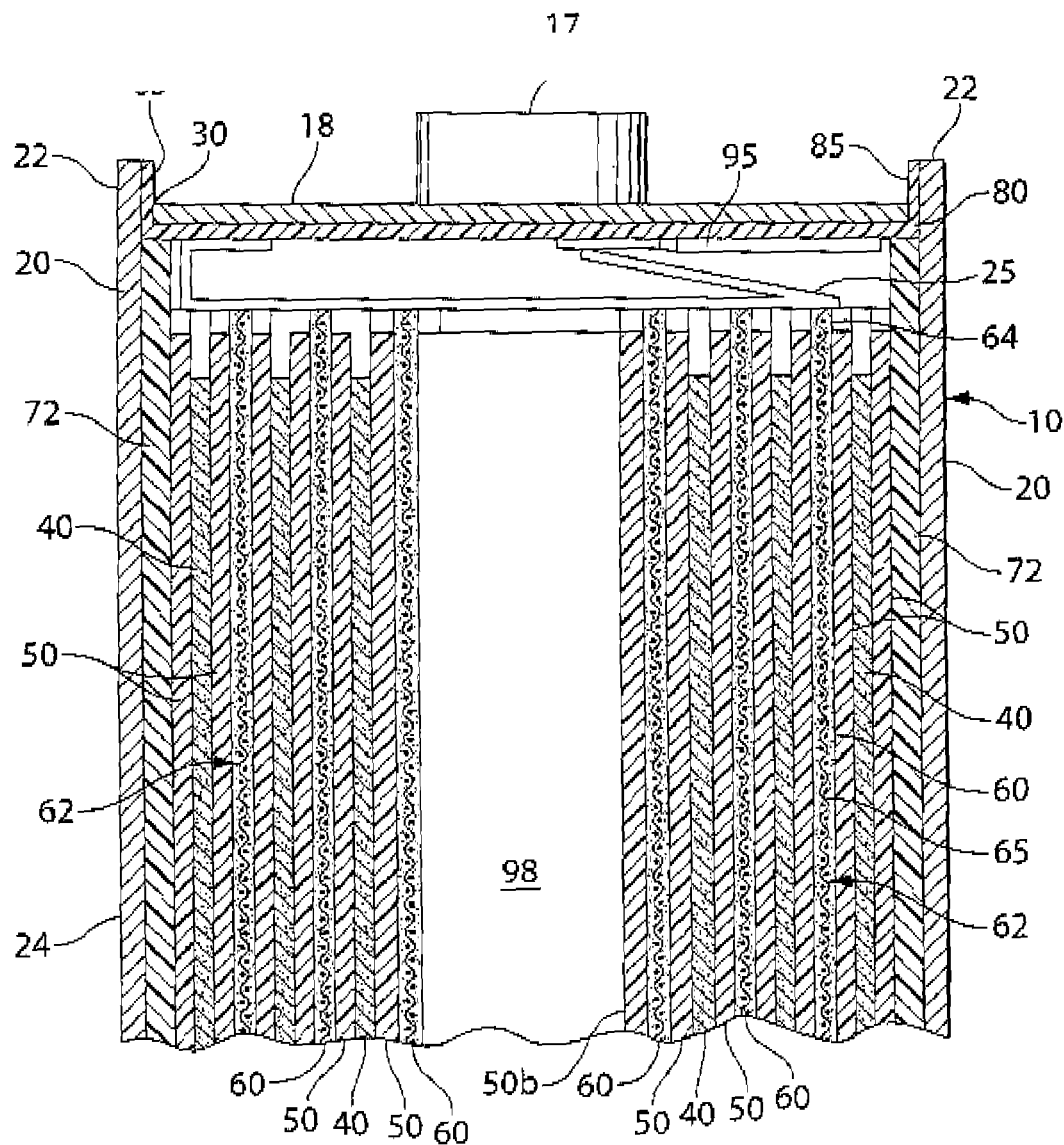
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polyester tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A nonaqueous electrolyte mixture can then be added to the wound electrode spiral 70 after it is inserted into the cell casing 20. The desired nonaqueous electrolyte comprises a lithium salt dissolved in an organic solvent.

A desirable electrolyte solvent comprises dimethoxyethane (DME), ethylene carbonate (EC), and propylene carbonate (PC). Preferably the dimethoxyethane (DME) comprises between about 40 and 98 wt %, the ethylene carbonate (EC) comprises between 1 and 30 wt. %, and the propylene carbonate (PC) comprises between 1 and 30 wt % of the electrolyte solvent mixture. A desirable electrolyte for the Li/FeS$_2$ wound cell 10 has been determined to comprise lithium salts lithium trifluoromethanesulfonate having the chemical formula LiCF$_3$SO$_3$ which can be referenced simply as LiTFS and/or the lithium salt Li(CF$_3$SO$_2$)$_2$N (LiTFSI) dissolved in the above organic solvent mixture comprising dimethoxyethane (DME), ethylene carbonate (EC), and propylene carbonate (PC). Preferably elemental iodine is added to the above electrolyte mixture so that it comprises between about 0.01 and 5 wt. % of the electrolyte mixture, preferably about 0.5 wt. % of the nonaqueous electrolyte mixture.

A first preferred electrolyte (Electrolyte 1) has been determined to be an electrolyte solution comprising 0.3 molar (0.3 mol/liter) LiCF$_3$SO$_3$ (LiTFS) salt and 0.6 molar (0.6 mol/liter) Li(CF$_3$SO$_2$)$_2$N (LiTFSI) salt, 0.25 wt % LiClO4 and 0.5 wt % elemental iodine dissolved in an organic solvent mixture comprising about 95 wt % dimethoxyethane (DME), 2 wt. % ethylene carbonate (EC), and 3 wt. % propylene carbonate (PC). The elemental iodine can be eliminated but better cell performance is obtained with the iodine added. The electrolyte mixture is desirably added on the basis of about 0.4 gram electrolyte solution per gram FeS$_2$.

A second preferred electrolyte (Electrolyte 2) has been determined to be an electrolyte solution comprising 0.54 molar (0.54 mol/liter) LiCF$_3$SO$_3$ (LiTFS) salt and 0.35 molar (0.35 mol/liter) Li(CF$_3$SO$_2$)$_2$N (LiTFSI) salt, 0.25 wt % LiClO4 and 0.5 wt % elemental iodine dissolved in an organic solvent mixture comprising about 75 wt. % dimethoxyethane (DME), 10 wt. % ethylene carbonate (EC), and 15 wt. % propylene carbonate (PC). The elemental iodine can be eliminated but better cell performance is obtained with the iodine added. The electrolyte mixture is desirably added on the basis of about 0.4 gram electrolyte solution per gram FeS$_2$.

An end cap 18 (FIG. 2) forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 may be flared along its top edge forming an extended portion 64 extending from the top of the wound spiral as shown in FIG. 2. The flared cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 (FIG. 1) which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

EXAMPLE

Experimental Test Lithium Coin

Cells with Cathode Comprising $FeS_2$

Experimental test $Li/FeS_2$ coin cells 100 (FIG. 1A) were prepared as follows:
Experimental Test Cell Assembly:

A coin shaped cathode housing 130 of nickel plated steel and a coin shaped anode housing (cover) 120 of nickel plated steel is formed of a similar configuration shown in FIG. 1A. The finished cell 100 had an overall diameter of about 25 mm and a thickness of about 3 mm. The weight of $FeS_2$ in the cathode housing 130 was 0.125 g. The lithium was in electrochemical excess.

In forming each cell 100, an Arbor press with a 0.780-inch die was used to punch out two stainless steel grids (316L-SS EXMET expanded metal foil). One stainless steel grid was centered inside of coin cell cathode housing 130 forming cathode current collector sheet 115. The other stainless steel grid (not shown) was resistance welded to the inside surface of closed end of the anode housing (cover) 120. The grids were welded to their respective housings using a Hughes opposing tip tweezers welder. The welder was set at 20 watts-seconds and a medium pulse. The welds that were formed were evenly spaced around the perimeters of the grids over intersecting points of mesh strands. For each cell, six to eight welds were formed per grid.

A plastic insulating disk (grommet) 140 was then attached to the edge of anode cover 120 (FIG. 1A). A lithium disk 150 formed of a sheet of lithium metal having a thickness of 0.032 inch (0.813 mm) was punched out in a dry box using an Arbor press and a 0.75 inch hand punch. The lithium disk 150 forming the cell's anode was then pressed onto the stainless steel grid against the inside surface of the closed end of anode cover 120 using an Arbor press.

A microporous polypropylene separator 160 (Celgard CG2400 separator from Celgard, Inc.) was cut into eight-inch strips and punched out using a hand punch having a diameter of 0.9375 inch and set aside.

Cathode conductive base layer 172 was prepared as follows:

Add 75 g of graphite (Timrex KS6 graphite) and 25 g of tetrafluoroethylene (Teflon) powder to a tumbler (with weights) and let run overnight in hood. Add contents to a blender (~10 g at a time) and blend on high for 1 minute. Pour blended contents into a container, label, and store until ready for use. When ready for application of cathode base layer 172, the cathode housing 130 was placed in a die. The cathode base layer 172 (0.500 g) was impacted onto a stainless steel grid 115 by using a ram connected to a Carver hydraulic press. The cathode base layer 172 had the composition 75 wt. % graphite and 25% Teflon powder.

A cathode slurry was then prepared and coated over one side of an aluminum sheet (not shown). The components of the cathode slurry comprising iron disulfide ($FeS_2$) were mixed together in the following proportion:

$FeS_2$ powder (58.9 wt. %); Binder, styrene-ethylene/butylene-styrene elastomer (Kraton G1651) (2 wt. %); Graphite (Timrex KS6) (4.8 wt %), Carbon Black (Super P carbon black) (0.7 wt %), Hydrocarbon Solvents, ShellSol A100 solvent (13.4 wt %) and ShelSol OMS solvent (20.2 wt %).

The wet cathode slurry on the aluminum sheet (not shown) was then dried in an oven between 40° C. and 130° C. until the solvent in the cathode slurry all evaporated, thus forming a dry cathode coating 170 comprising $FeS_2$, conductive carbon and elastomeric binder on a side of the aluminum sheet. The aluminum sheet carrying cathode coating 170 was an aluminum foil of 20 micron thickness. The same composition of wet cathode slurry was then coated onto the opposite side of the aluminum sheet and similarly dried. The dried cathode coatings on each side of the aluminum sheet was calendered to form a dry cathode 170 having a total final thickness of about 0.176 mm, which includes the 20 micron thick aluminum foil. The dry cathode coating 170 had the following composition:

$FeS_2$ powder (89.0 wt. %); Binder Kraton G1651 elastomer (3.0 wt. %); conductive carbon particles, graphite Timrex KS6 (7 wt. %) and carbon black, Super P (1 wt %).

The composite of the dry cathode coating 170 coated on both sides of the aluminum sheet was then die punched into the cathode housing 130 onto carbon base layer 172. This was done by placing cathode housing 130 within a die. A cut to size composite of aluminum sheet coated on both sides with dry cathode coating 170 was then aligned directly over cathode base layer 172 within housing 130. A ram was then inserted into the die holding housing 130, and the die was moved to a hydraulic press. Four metric tons of force was applied using the press to punch the composite into the cathode housing 130 so that it was impacted against cathode base layer 172. The die was then inverted and the housing 130 gently removed from the die. The surface of the exposed cathode layer 170 had a smooth, consistent texture. The finished cathode coin was then placed in a vacuum oven and was heated at 150° C. for 16 hours.

An electrolyte solution (Electrolyte 1) was prepared comprising 0.3 molar (0.3 mol/liter) $LiCF_3SO_3$ (LiTFS) salt and 0.6 molar (0.6 mol/liter) $Li(CF_3SO_2)_2N$ (LiTFSI) salt, 0.25 wt % LiClO4 and 0.5 wt % elemental iodine dissolved in an organic solvent mixture comprising aobut 95 wt % dimethoxyethane (DME), 2 wt. % ethylene carbonate (EC), and 3 wt. % propylene carbonate (PC). The electrolyte mixture is desirably added on the basis of about 0.4 gram electrolyte solution per gram $FeS_2$.

The cathode coin, that is, cathode housing 130 with dried cathode 170 therein, was placed into a glass coin holder for vacuum filling with electrolyte. A rubber stopper with an attached burette fill tube was placed on top of the cathode coin holder. The fill valve on the tube was closed and the vacuum valve was opened for approximately one minute.

The above described electrolyte containing 0.5 wt. % elemental iodine, was slowly added using a pipette. The vacuum valve was closed and the burette valve was opened. After about one minute, the vacuum valve was shut off, and the fill valve was opened slowly to fill the cathode housing 130 and allow cathode 170 to absorb most of the electrolyte.

The filled cathode coin was removed using plastic tweezers, and was placed on the base of a crimper so that it sat securely on the base. A pipette was used to flood the coin with the excess of electrolyte that was left over in the glass holder.

The microporous polypropylene separator 160 (Celgard CG2400 separator) was placed on top of the electrolyte wet cathode layer 170 and was centered. The cathode housing 130 was then re-flooded with electrolyte.

An anode coin, that is, the anode cover 120 with lithium anode sheet 150 therein was placed on top of the cathode housing 130 and was centered within a mechanical crimper until the anode cover 120 fit evenly inside of the cathode housing 130. A mechanical crimper arm was then pulled down all of the way to crimp the peripheral edge 135 of the cathode housing 130 over the edge of insulating disk 140 thus forming fresh coin cell 100. This process was repeated for each cell. After each cell had been formed, the outside surfaces of the housings of the cells were wiped cleaned with methanol.

Test Experiment 1

Identical coin cells 100 were prepared fresh as above described employing the above indicated Electrolyte 1 solution. The cells were then divided into two groups. One cell group (Group I Test Cells) was subjected to a preconditioning protocol of the invention involving a two step pulsed discharge with intermediate storage (step rest) carried out at above ambient temperature between steps. That is, after the first pulsed discharge step, the cell was stored for a period at a temperature above ambient, specifically at about 60° C., and then the Group I test cells was subjected to a second pulsed discharge step. The other cell group (Group II Control Cells) was the control group which was subjected to only a one step pulsed discharge and was not stored at any time at a temperature above ambient. In both the Group I and Group II cells the same small fraction (<10%) of the cell's total theoretical capacity was expended during the preconditioning protocol.

Group I Test Cells (Two Step Predischarge Protocol of the Invention)

The following specific preconditioning protocol of the invention applied to the Group I test cells involved a two step pulsed predischarge with elevated temperature storage between the steps. Each discharge pulse was at 35 mAmp for 7 seconds, followed by an intermittent pulse rest of 22 seconds. Fresh Group I cells were subjected to:

Step 1 Pulsed Discharge:

13 discharge pulse cycles (each pulse cycle at 35 mAmp for 7 sec, followed by intermittent pulse rest 22 seconds).

Storage at Above Ambient

Then the Group I test cells were subjected to storage (step rest) at a temperature of 60° C. for a period of 22-24 hours.

Step 2 Pulsed Discharge:

Then the Group I test cells were subjected to 14 discharge pulse cycles (each pulse cycle at 35 mAmp for 7 sec, followed by intermittent pulse rest 22 seconds).

Final Storage at Above Ambient Temperature

The Group I test cells were then subjected to a final storage (step rest) at a temperature of 60° C. for a period of 22-24 hours.

Group II Cells (Control Cells—One Step Predischarge Protocol)

The Group II cells were subjected to only one pulsed discharge step without any storage at above ambient temperature. Each discharge pulse was at 35 mAmp for 7 seconds, followed by an intermittent pulse rest of 22 seconds. Fresh Group II control cells were subjected to the following one step predischarge protocol:

Step 1 Pulsed Discharge:

27 discharge pulse cycles (each pulse cycle at 35 mAmp for 7 sec, followed by intermittent pulse rest 22 seconds)

The Digital Camera Simulation Test

After the Group I test cells and Group II control cells had been subjected to the above described preconditioning protocol, the discharge capacity of the Group I test cells and Group II control cells were tested using a test that was meant to mimic the use of the cell in a digital camera scaled down based on the weight of cathode active material.

The digital Camera simulation test consists of the following pulsed test protocol: Each pulsed cycle as indicated on the x-axis of FIG. 6 consisted of: 10 intermediate cycles wherein each intermediate cycle consisted of both a 26 milliWatt pulse for 2 seconds followed immediately by a 12 milliWatt pulse for 28 seconds and then followed by 55 minutes rest. These pulsed cycles were repeated until a cut off voltage of 1.05 Volt is reached.

Discharge of the Group I test cells and Group II control cells was done on Maccor 4000 cycling equipment. The cells were discharged to the same cut off voltage of 1.05 volts using the above indicated digital camera simulation discharge test. The Voltage Discharge profiles of the Group I and Group II cells are shown in FIG. 6.

Performance Results

Figure 6:
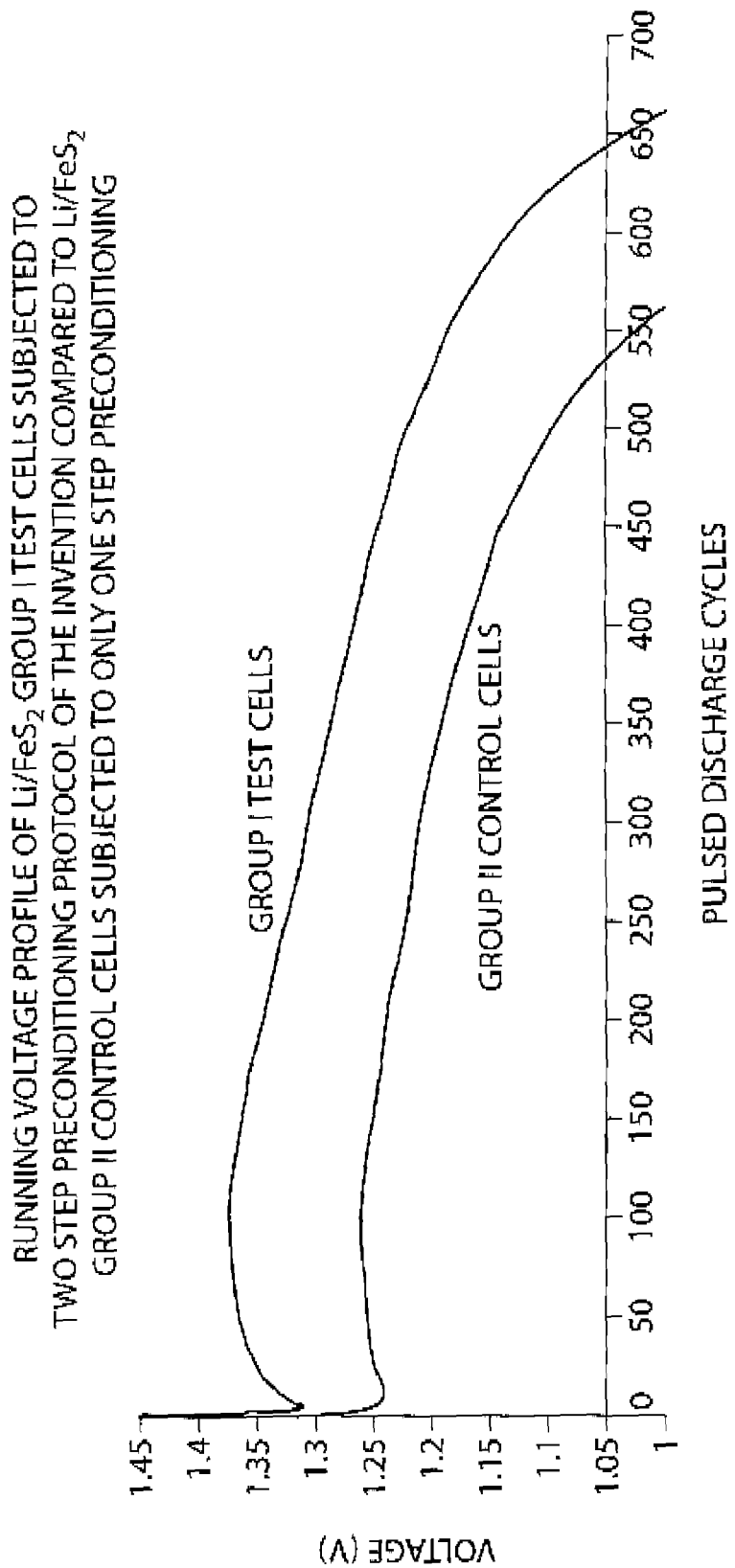
FIG. 6 is a plot of running voltage profile versus number of pulsed discharge cycles for Group I $Li/FeS_2$ test cells were subjected to the two step predischarge protocol of the invention and the Group II $Li/FeS_2$ control cells were subjected to only one step predischarge protocol.

As may be seen from the FIG. 6 the running voltage profile of the Group I test cells subjected to the preconditioning protocol of the invention was on average about 100 milliVolts higher than the Group II control cells. This resulted in an energy output (at cut off voltage of 1.05 Volt) of the Group I cells which was clearly much higher than the energy output of Group II cells. The energy output of the Group II test cells which were subjected to the two step predischarge protocol of the invention was about 15 percent higher than the Group I control cells as measured at common cut off voltage of 1.05 volts.

Test Experiment 2

Two Groups of cells Group IA and Group IIA were prepared. The Group IA test cells were identical to the Group I test cells (see test experiment 1) and the Group IIA control cells were identical to the Group II control cells (test experiment 1) in every respect except that Electrolyte 1A was employed in each cell Group IA and IIA instead of Electrolyte 1. The Electrolyte 1A was the same formulation as Electrolyte 1 except that there was no elemental iodine added to the electrolyte solution. Thus the Electrolyte 1A used in Group IA test cells and Group IIA control cells had the following formulation: The Electrolyte 1A solution was prepared comprising 0.3 molar (0.3 mol/liter) $LiCF_3SO_3$ (LiTFS) salt and 0.6 molar (0.6 mol/liter) $Li(CF_3SO_2)_2N$ (LiTFSI) salt, and 0.25 wt % LiClO4 dissolved in an organic solvent mixture comprising about 95 wt % dimethoxyethane (DME), 2 wt. % ethylene carbonate (EC), and 3 wt. % propylene carbonate (PC). The electrolyte mixture was added on the basis of about 0.4 gram electrolyte solution per gram $FeS_2$.

The Group IA test cells were subjected to the same two step preconditioning protocol of the invention as above described with respect to the Group I test cells (see Test Experiment 1). The Group IIA control cells were subjected to the same one step preconditioning protocol as described above with respect to the Group II control cells (see Test Experiment 1).

Figure 6A:
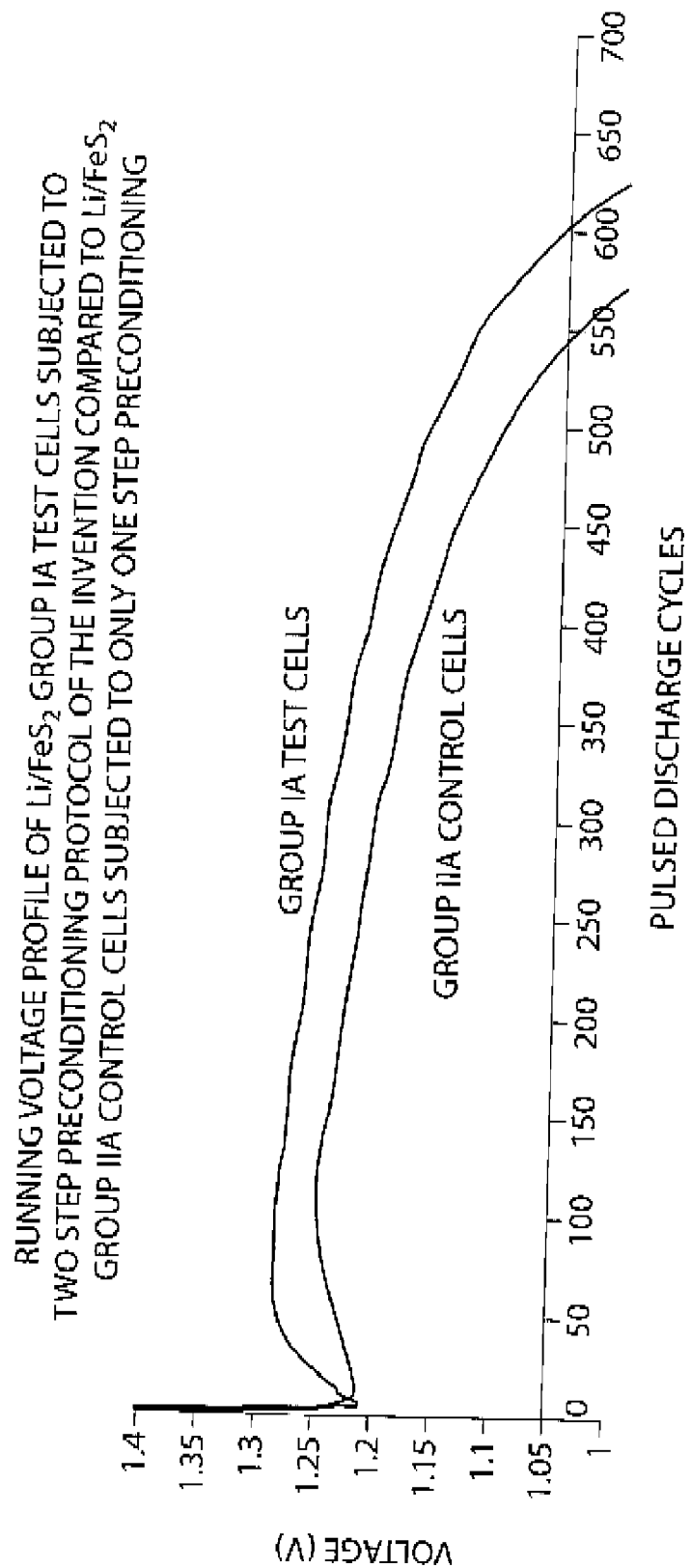
FIG. 6A is a plot of running voltage profile versus number of pulsed discharge cycles for Group IA Li/FeS2 test cells subjected to the two step predischarge protocol of the invention and the Group IIA Li/FeS2 control cells were subjected to only one step predischarge protocol.

After the Group IA test cells and Group II control cells had been subjected to the above indicated preconditioning protocol, The Group IA test cells and Group IIA control cells were then discharged to a cut off voltage of 1.05 Volt using the same digital camera simulation discharge regimen as described above in Test Experiment 1. Although there was no elemental iodine added to Electrolyte 1A used in the Group IA and Group IIA cells, the Group IA test cells (subjected to the two step preconditioning protocol of the invention) still exhibited a higher running voltage profile than the Group IIA control cells (which were subjected to only a one step preconditioning protocol). As may be seen from FIG. 6A the running voltage profile of the Group IIA test cells was on average about 50 millivolts higher than the voltage discharge profile of the control cells. This resulted in an energy output (at cut off voltage of 1.05 Volt) of the Group IA test cells which was clearly higher than the energy output of Group IIA control cells. The energy output of the Group IA test cells which were subjected to the two step predischarge protocol of the invention was about 10 percent higher than the Group IIA control cells as measured at common cut off voltage of 1.05 Volts.

Test Experiment 3

Two Groups of cells Group III test cells and Group IV control were prepared. The Group III test cells were identical to the Group I test cells (see test experiment 1) and the Group IV control cells were identical to the Group II control cells (test experiment 1) in every respect except that Electrolyte 2 was used instead of Electrolyte 1. Thus Group III test cells and group IV control cells employed Electrolyte 2 therein of following formulation: The Electrolyte 2 formulation comprised 0.54 molar (0.54 mol/liter) $LiCF_3SO_3$ (LiTFS) salt and 0.36 molar (0.36 mol/liter) $Li(CF_3SO_2)_2N$ (LiTFSI) salt, 0.25 wt % LiClO4 and 0.5 wt % elemental iodine dissolved in an organic solvent mixture comprising about 75 wt. % dimethoxyethane (DME), 10 wt. % ethylene carbonate (EC), and 15 wt. % propylene carbonate (PC). The electrolyte mixture was added on the basis of about 0.4 gram electrolyte solution per gram $FeS_2$.

The Group III test cells were subjected to the same two step preconditioning protocol of the invention as above described with respect to the Group I test cells (see Test Experiment 1). The Group IV control cells were subjected to the same one step preconditioning protocol as described above with respect to the Group II cells (see Test Experiment 1).

The Group III test cells and Group IV control cells were then discharged to a cut off voltage of 1.05 Volt using the same digital camera simulation discharge regimen as described above in Test Experiment 1. The running voltage profile of the Group III test cells was on average about 50 millivolts higher than the running voltage profile of the Group IV control cells. The energy output of the Group III test cells, which were subjected to the two step predischarge protocol of the invention, was about 8 percent higher than the Group IV control cells as measured at common cut off voltage of 1.05 Volts.

In sum the Li/FeS2 fresh cells which were subjected to the two step pulsed preconditioning protocol of the invention which also included storage at elevated temperature between the two pulsed steps exhibited better performance than the same cells which were only subjected to a one step preconditioning protocol without elevated temperature storage. (Both the test cells and control cells were subjected to the same amount of capacity drain, mAmp, during the preconditioning protocols.)

Specifically, the test cells which were subjected to the two step preconditioning protocol of the invention which included elevated temperature storage between steps exhibited a higher running voltage profile and higher energy output than the same cells with same electrolyte which were subjected to only a one step pulsed predischarge protocol without elevated temperature storage. Even better cell performance of the test cells subjected to the two step predischarge protocol of the invention was achieved when elemental iodine was also added to the electrolyte solution. However, improved cell performance was obtained when of the test cells were subjected to the two step preconditioning protocol of the invention even when elemental iodine was not added to the electrolyte solution. It is theorized that the preconditioning protocol of the invention mitigates the deleterious effect of the lithium passivation layer which normally accumulates on the surface of the exposed lithium anode surface, possibly by altering the chemistry of said lithium passivation layer. Thus, $Li/FeS_2$ cell performance can be improved when the cells are first subjected to the above described preconditioning protocol of the invention.

Although a specific embodiment of the preconditioning protocol of the invention involving only a two step pulsed discharge with intermediate cell storage at elevated temperature was employed to illustrate the beneficial effects of the invention protocol, it is not intended that the invention be limited to this exact regimen. For example, additional beneficial cell performance could possibly be obtained if the test cells were further subjected to additional predischarge steps. Such additional steps, may include additional pulsed cycles within each step followed by cell storage at elevated temperature between or after said additional steps. Accordingly, the test experiments described herein are intended to be representative only of a specific embodiment of the preconditioning protocol of the invention, as applied to the $Li/FeS_2$ cells.

Thus, although the invention has been described with reference to specific embodiments, it should be appreciated that other embodiments are possible without departing from the concept of the invention and are thus within the claims and equivalents thereof.

What is claimed is:

1. A method of preconditioning a primary electrochemical cell having an anode comprising lithium or lithium alloy, a cathode comprising iron disulfide, a separator disposed between the anode and the cathode, and an electrolyte comprising lithium salt, an organic ether, and elemental iodine, the method comprising the steps of:
   (a) providing an assembled primary electrochemical cell having a theoretical capacity;
   (b) applying a plurality of current pulses to the cell thereby discharging the cell to consume up to about 10 percent of the theoretical capacity of the cell; and
   (c) resting the cell for a period of between about 2 and 48 hours;
   wherein the steps of applying a plurality of current pulses and resting the cell are performed before the cell is released for commercial sale.

2. The method of claim 1, wherein in the step of applying a plurality of current pulses to the cell the plurality of current pulses comprises between two and one hundred pulses.

3. The method of claim 1, wherein in the step of applying a plurality of current pulses to the cell the current pulses have an average current density of between about 1 mAmp/cm$^2$ and about 50 mAmp/cm$^2$ as measured by a current passing through an interfacial area formed between the anode and the cathode.

4. The method of claim 3, wherein in the step of applying a plurality of current pulses to the cell the current pulses are applied for an average duration of between about 2 and 20 seconds.

5. The method of claim 4, wherein the step of applying of plurality of current pulses includes a period of intermittent pulse rest of from about 10 to about 100 seconds between the discharge-current pulses.

6. The method of claim 1, wherein the organic ether comprises dimethoxyethane.

7. The method of claim 1, wherein the lithium salt is selected from the group consisting of LiCF$_3$SO$_3$ (LITFS), Li(CF$_3$SO$_2$)$_2$N (LiTFSI), and mixtures thereof.

8. The method of claim 1, wherein the cathode further comprises conductive carbon.

9. The method of claim 1, wherein the elemental iodine comprises between about 0.01 and about 5.0 percent by weight of the electrolyte.

10. The method of claim 1, wherein in the step of resting the cell the cell is rested at a temperature of between about 21° C. and about 70° C.

* * * * *